United States Patent
Nakahara

(10) Patent No.: US 6,724,448 B2
(45) Date of Patent: Apr. 20, 2004

(54) LIQUID CRYSTAL DISPLAY DEVICE AND MANUFACTURING METHOD BY COMPRESSION BONDING

(75) Inventor: Hiroki Nakahara, Shiojiri (JP)

(73) Assignee: Seiko Epson Corporation (JP)

( * ) Notice: Subject to any disclaimer, the term of this patent is extended or adjusted under 35 U.S.C. 154(b) by 200 days.

(21) Appl. No.: 09/742,882

(22) Filed: Dec. 20, 2000

(65) Prior Publication Data

US 2001/0022640 A1 Sep. 20, 2001

(30) Foreign Application Priority Data

Dec. 24, 1999 (JP) ......................................... H11-366424

(51) Int. Cl.$^7$ ............................................ G02F 1/1337
(52) U.S. Cl. ......................................... 349/123; 349/155
(58) Field of Search ................................. 349/123, 153, 349/155

(56) References Cited

U.S. PATENT DOCUMENTS 6,466,294 B1 * 10/2002 Yamagishi et al. ......... 349/155

FOREIGN PATENT DOCUMENTS

| JP | 60-216332 |   | 10/1985 |   |           |
|----|-----------|---|---------|---|-----------|
| JP | 63-164724 |   | 7/1988  |   |           |
| JP | 04-083227 |   | 7/1990  |   |           |
| JP | 07-311385 |   | 5/1994  |   |           |
| JP | 10-003089 |   | 6/1996  |   |           |
| JP | 11-242234 |   | 2/1998  |   |           |
| JP | 11-337953 |   | 5/1998  |   |           |
| JP | 11-002820 | * | 6/1999  |   | G02F/1/1339 |

* cited by examiner

Primary Examiner—Tarifur R. Chowdhury
Assistant Examiner—P. R. Akkapeddi
(74) Attorney, Agent, or Firm—Harness, Dickey & Pierce, P.L.C.

(57) ABSTRACT

When transparent substrates 110 and 120 are compression-bonded via a sealing member 130, conductive particles 132 formed to be slightly larger break through relatively soft alignment layers 113 and 123 to become in contact with both inner end portions 111c and outer end portions 121c, and in this state, the sealing member 130 is cured.

4 Claims, 5 Drawing Sheets

FIG. 3
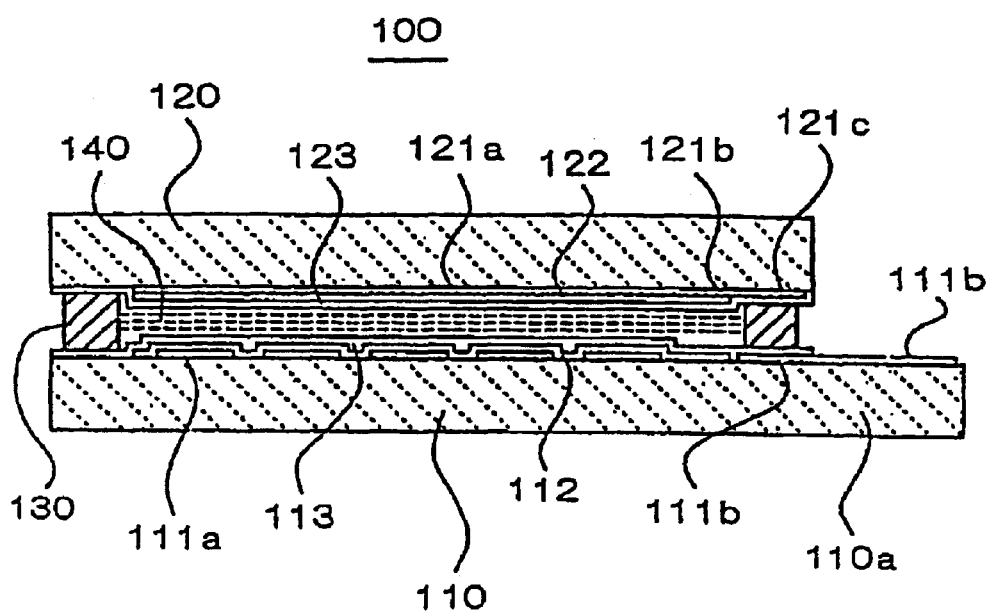
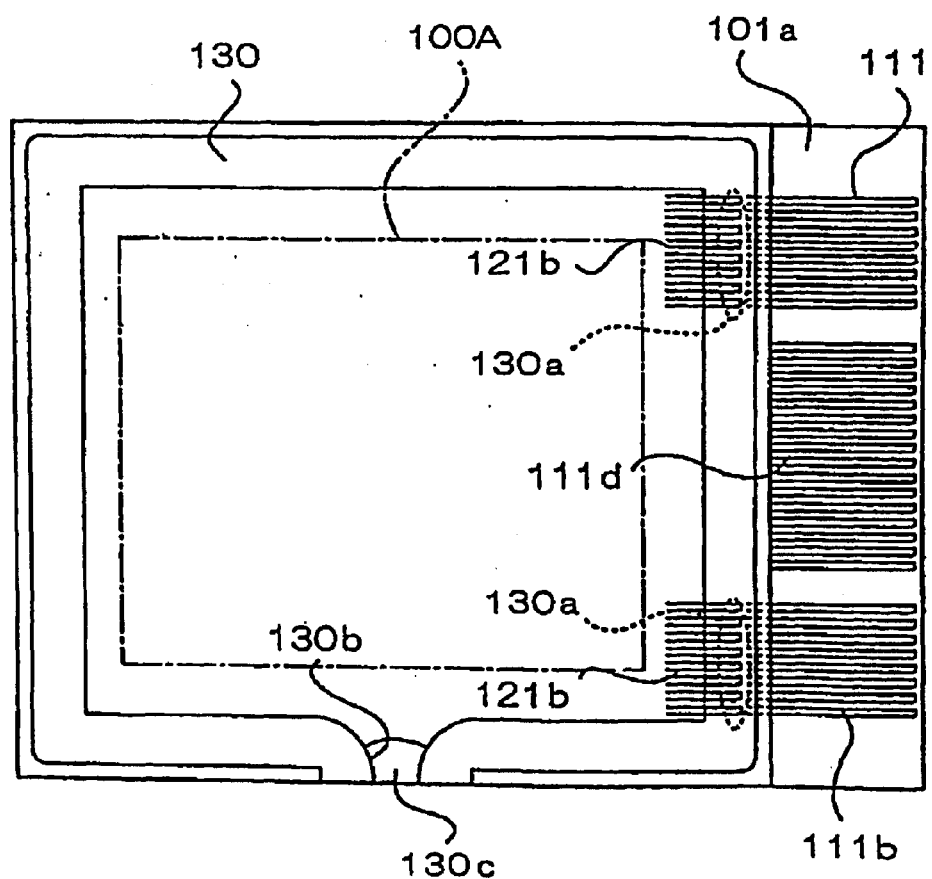
FIG. 4

PRIOR ART

LIQUID CRYSTAL DISPLAY DEVICE AND MANUFACTURING METHOD BY COMPRESSION BONDING

BACKGROUND OF THE INVENTION

1. Technical Field of the Invention

The present invention relates to a liquid crystal device and a manufacturing method therefor, and more specifically, it relates to a structure of a vertical conducting portion formed between two substrates making up the liquid crystal device.

2. Description of the Related Art

In general, a conventional liquid crystal is formed by: forming electrodes and wires connected to the electrodes on two substrates, respectively; further forming alignment layers thereon; attaching the two substrates to each other via a sealing member and curing the sealing member, the substrates being compression-bonded so as to provide a desired gap between the substrates, thereby fixing the gap between the substrates; and injecting a liquid crystal inside the sealing member and sealing it.

In such a liquid crystal device, normally, one substrate is provided with a projecting portion that projects outward beyond an outer edge of the other substrate, and the wire connected to the electrode formed on a substrate surface is drawn out onto a surface of the projecting portion, a distal end portion of the wire being formed as an external terminal. At this time, there are cases where the projecting portions are formed on the two substrates, respectively, and the wires connected to the electrodes formed on the respective substrate surfaces are drawn out onto the surfaces of the respective projecting portions. In many cases, however, the projecting portion is formed only on one of the two substrates. And in this case, a vertical conducting portion for conductively connecting the electrode on the substrate, in which the projecting portion is not formed, to the external terminal on the projecting portion formed on the other substrate is provided. In the vertical conducting portion, there are some cases where a part of a sealing member for sealing a liquid crystal in between two substrates attached to each other is formed into a conductive area.

FIG. 5 and FIG. 6 are a schematic sectional view and a schematic top plan view of a vertical conducting portion in the above liquid crystal display panel. A conducting region 130a that has been cured in a compression-bonded state is disposed between two transparent substrates 110 and 120 making up the liquid crystal display panel. The conducting region 130a is a part of the sealing member. In the conducting region 130a, spacers 131 composed of resin balls, glass fibers, glass balls, or the like for restricting a cell thickness of the liquid crystal display panel and the foregoing conductive particles 133 are scatteringly disposed, as shown in FIG. 6. A plurality of external wires 111b which are formed to be drawn onto the surface of a projecting portion 110a of the transparent substrate 110 and are formed of a transparent conductive member are formed in parallel on a surface of the transparent substrate 110 that is in contact with the conducting region 130a. Inner end portions 111c of the external wires 111b are in contact with the conducting region 130a of the sealing member. Internal wires 121b which are connected to electrodes, which are not shown, and extend toward an outer edge of the substrate are formed on a surface of the transparent substrate 120. Outer end portions 121c of the internal wires 121b are in contact with the conducting region 130a. The conductive particles 133 in the conducting region 130a are in conductive contact with both the inner end portions 111c and the outer end portions 121c. Hence, the electrodes, not shown, which are formed on the surface of the transparent substrate 120 are conductively connected to the external wires 111b formed on the surface of the projecting portion 110a through the internal wires 121b and the conductive particles 133.

The conventional liquid crystal display panel has been configured such that the outer edges of the alignment layers 113 and 123 are disposed farther inward than the area where the sealing member or the foregoing conducting region 130a is disposed in order to prevent the alignment layers 113 and 123 from interfering with conductive contact between the inner end portions 111c of the external wires 111b and the outer end portions 121c of the internal wires 121b, and the conductive particles 133.

In recent years, however, with an increasing demand for liquid crystal display panels to provide larger display areas and reduced sizes, there has been increasing necessity for making the portions surrounding the display areas (the areas where the electrodes are arranged and formed on substrate surfaces) as narrow as possible in designing a liquid crystal display panel (thereby narrowing the frames of the liquid crystal display panels). To narrow the peripheral portion of a display area, the space between an outer edge of the display area and an inner edges of the vertical conducting portion must be also reduced. As a method for applying the alignment layers 113 and 123, a cheap printing method, such as flexo printing or offset printing that exhibits lower patterning accuracy than photolithography, which is a patterning method for transparent electrodes, etc. is used. Therefore, in order to securely position the outer edges of the alignment layers 113 and 123 between the outer edge of the display area and the inner edge of the vertical conducting portion, it is required to design the space between the outer edge of the display area and the inner edge of the vertical conducting portion with accuracy as good as or better than the printing accuracy of the alignment layers. For this reason, a conventional manufacturing process has been having some limitation, which is attributable to patterning accuracy of the alignment layers, in achieving a narrower area surrounding the display area without adopting a method that leads to higher cost, such as changing a method for applying the alignment layers.

Accordingly, the present invention has been made with a view toward solving the above problem, and the object of the present invention is to provide a structure that enhances freedom of designing and allow a larger display area and a reduced size of a liquid crystal device, by adopting a structure of a vertical conducting portion that is capable of achieving a narrower portion surrounding the display area, without being affected by a patterning accuracy of the alignment layers.

SUMMARY OF THE INVENTION

To solve the problem described above, a liquid crystal device in accordance with the present invention is formed by a first substrate and a second substrate which have electrodes and alignment layers formed on surfaces thereof and are attached to each other with a liquid crystal sealed in therebetween, comprising: a first conductive member formed on a surface of a peripheral portion of the first substrate; a second conductive member formed on a portion on the second substrate that opposes the first conductive member; and a vertical conducting portion having a conductive material containing conductive particles for electrically conductive connection between the first conductive member and the second conductive member, wherein the alignment layer is formed such that it extends to cover the surface of at least one of the first conductive member and the second conductive member, and the conductive particles break through the alignment layer to be in conductive contact with the first conductive member and the second conductive member.

According to the present invention, since the conductive particles in the conductive member break through the alignment layers to contact the first conductive member and the second conductive member, it is no longer necessary to avoid the vertical conducting portion in forming the alignment layers as in the prior art, eliminating the restrictions on the positions of the outer edges of the alignment layers. As a result, design freedom in the peripheral portion of the display area of a liquid crystal device is enhanced, so that the peripheral portion can be made narrower, thus permitting a larger display area and a reduced size of the liquid crystal device to be achieved. Furthermore, since the conductive members, such as wires, in the vertical conducting portion can be covered by the alignment layers, the corrosion resistance of the vertical conducting portion can be improved. Moreover, the alignment layers can be formed in a larger area, making it possible to enhance uniformity of a rubbing condition.

In the present invention described above, the alignment layer may cover at least one of the first conductive member and the second conductive member, and the conductive particles break through the alignment layer covering one of the conductive members to be in conductive contact with the conductive member and also in conductive contact with the other conductive member. The alignment layer may only partially cover the first conductive member or the second conductive member rather than covering it entirely. It is, however, more desirable and effective that the respective alignment layers cover the first conductive member and the second conductive member, and the conductive particles break through both alignment layers to be in conductive contact with both the first conductive member and the second conductive member.

In the present invention, the alignment layer that covers at least one of the first conductive member and the second conductive member is preferably formed on an entire surface of an area of a substrate surface where the first substrate and the second substrate oppose each other, except a place where the conductive particles are disposed. According to the present invention, since the alignment layer is formed on the entire surface in the area where the substrates oppose each other except the place where the conductive particles are disposed, the alignment layer can be formed more easily, and the uniformity of the rubbing condition can be further improved.

In the present invention, the conductive member is preferably a sealing member for sealing a liquid crystal in between the first substrate and the second substrate.

Furthermore, the liquid crystal device according to the present invention includes a first substrate and a second substrate which have electrodes and alignment layers formed on surfaces thereof and are attached to each other with a liquid crystal sealed in therebetween, comprising: a first conductive member that is formed on a surface of a peripheral portion of the first substrate and electrically connected to the electrode; a second conductive member that is formed on a portion on the second substrate opposing the first conductive member and electrically connected to the electrode; and a vertical conducting portion having a conductive material containing conductive particles for conductive connection between the first conductive member and the second conductive member, wherein the alignment layer is provided on a surface of at least one of the first conductive member and the second conductive member except a place where the conductive particles are provided, and the conductive particles are in conductive contact with the first conductive member and the second conductive member.

Next, a manufacturing method according to the present invention is a manufacturing method for a liquid crystal device having a first substrate and a second substrate which have electrodes and alignment layers formed on surfaces thereof and are attached to each other with a liquid crystal sealed in therebetween, and comprising a first conductive member formed on a surface of a peripheral portion of the first substrate, a second conductive member formed on a portion on the second substrate that opposes the first conductive member, and a vertical conducting portions having a conductive material containing conductive particles for conductive connection between the first conductive member and the second conductive member, whereby the alignment layer is extendedly formed to cover the surface of at least one of the first conductive member and the second conductive member, and the first substrate and the second substrate are attached to each other via the conductive material and compression-bonded thereby to cause the conductive particles break through the alignment layer to be in conductive contact with the first conductive member and the second conductive member.

In the present invention, preferably, in a step for extendedly forming the alignment layer to cover at least one of the first conductive member and the second conductive member, the alignment layer is formed on an entire area of the substrate surface where the first substrate and the second substrate oppose each other. In this case, the alignment layers are preferably formed over the entire substrate surfaces of both the first substrate and the second substrate, and after completing a panel structure, the alignment layers on the area where the external terminals are arranged are removed.

In the present invention, the conductive material is preferably used as a sealing material for sealing a liquid crystal in between the first substrate and the second substrate.

In the individual aspects of the present invention described above, it is further preferable that a thickness of the alignment layers ranges from 100 to 400 angstroms, and more preferably, from 100 to 300 angstroms.

In the individual aspects of the present invention described above, an outside diameter of the conductive particle is preferably 5 to 20% larger than a cell thickness.

BRIEF DESCRIPTION OF THE DRAWINGS

FIG. 3 is a schematic sectional view schematically showing an entire structure of the embodiment.

FIG. 4 is a schematic top plan view schematically showing the entire structure of the embodiment.

DETAILED DESCRIPTION OF THE PREFERRED EMBODIMENTS

Figure 1:
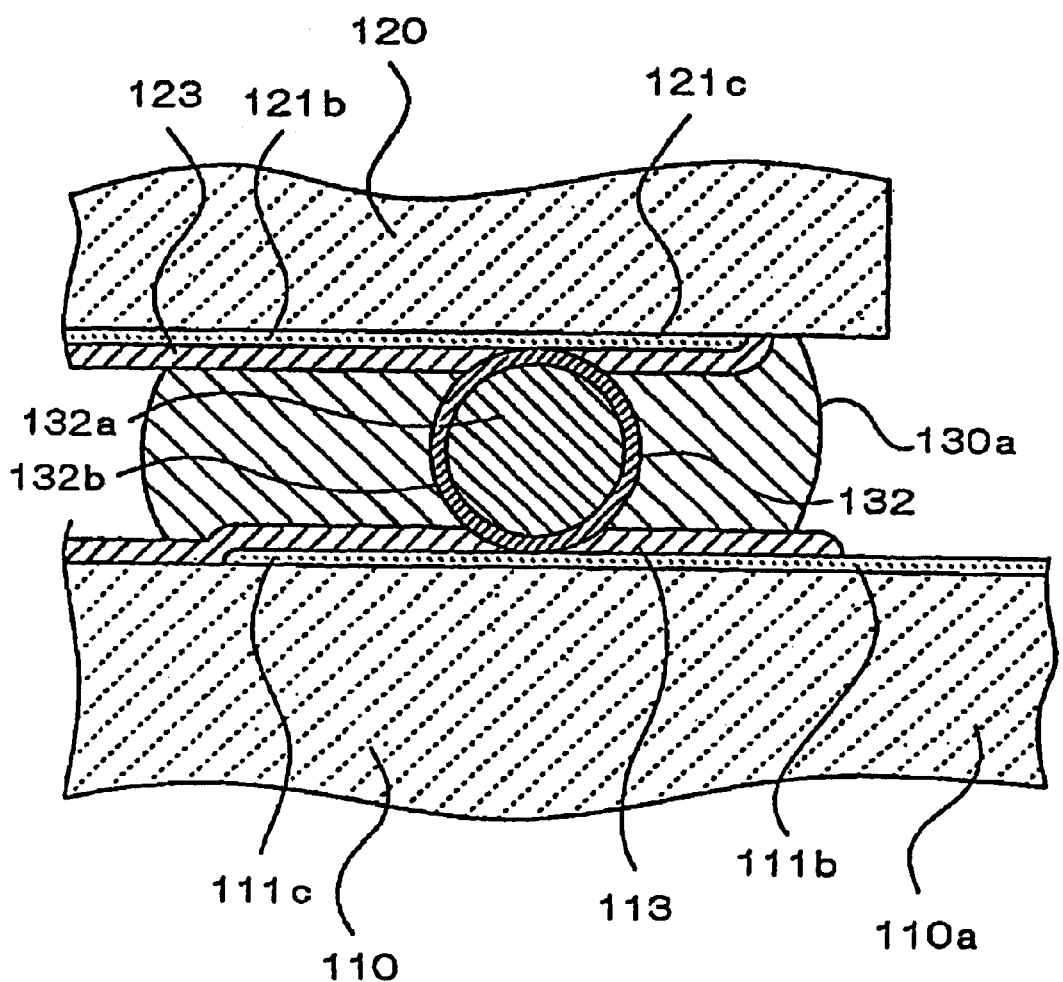
FIG. 1 is an enlarged sectional view showing a structure of a vertical conducting portion in an embodiment of a liquid crystal device in accordance with the present invention.

An embodiment of the liquid crystal device and the manufacturing method therefor in accordance with the present invention will now be described in detail with reference to the accompanying drawings. FIG. 3 is a schematic sectional view that schematically illustrates an entire liquid crystal display panel 100 constituting a liquid crystal device according to this embodiment, and FIG. 4 is a schematic top plan view that schematically illustrates the entire liquid crystal display panel 100.

The liquid crystal display panel 100 is formed by attaching a transparent substrate 110 composed of glass or the like and a similar transparent substrate 120 via an uncured sealing member 130, compression-bonding them so that a predetermined cell thickness (e.g. 5 to 10 $\mu$m) is obtained, and curing the sealing member 130 in that state. A liquid crystal 140 is injected into the sealing member 130 and sealed. The liquid crystal display panel 100 is provided with a projecting portion 110a formed by a part of the transparent substrate 110 that projects outward beyond an outer edge of the transparent substrate 120. External wires 111b and 111d, which will be discussed later, are formed on a surface of the projecting portion 110a.

On a surface of the transparent substrate 110, a transparent conductive layer of ITO (indium tin oxide) or the like is formed by sputtering process or the like, and this transparent conductive layer is patterned by photolithography or the like so as to form plurality of transparent electrodes 111a and external wires 111b and 111d, respectively. A protective film (top coating film) 112 composed of a hard film, such as oxide silicon or titanium oxide, is formed on the transparent electrode 111a.

An uncured polyimide resin is applied onto the protective film 12 by offset printing or flexo printing, and baked at a predetermined temperature to form an alignment layer 113. In this embodiment, the alignment layer 113 is formed to cover the entire area of the surface of the transparent substrate 110 that opposes the transparent substrate 120. Thereafter, a surface of the alignment layer 113 is subjected to a rubbing process to impart alignment performance in a predetermined direction with respect to liquid crystal molecules.

On a surface of the transparent substrate 120, a plurality of transparent electrodes 121a and internal wires 121b composed of transparent conductive members and formed in the same manner as that set forth above are formed. A protective film 122 similar to that mentioned above is formed thereover, and an alignment layer 123 similar to that mentioned above is formed over the protective film 122. In this embodiment, the alignment layer 123 is formed all over the surface of the transparent substrate 120 in the same manner as the one set forth above. The alignment layer 123 is also subjected to the similar rubbing process.

The sealing member 130 for bonding the transparent substrates 110 and 120 uses a photo-curing resin or heat-curing resin as its base material. Spacers having an outside diameter corresponding to a desired cell thickness and conductive particles are dispersed in the base material. Normally, the spacers are spherical members or columnar members composed of a hard resin, and the conductive particles are formed of resin balls having their outer surfaces covered with conductive layers by plating or the like. As the conductive particles, unprocessed conductive particles, such as metal particles, may be used. In this embodiment, the conductive particles are mixed in so as to construct a vertical conducting portion by using a part of the sealing member 130. As an alternative, however, an anisotropic conductive member in which conductive particles have been mixed may be provided separately from the sealing member 130 rather than adding the conductive particles to the sealing member 130. The sealing member 130 is provided with a liquid crystal injection port 130b through which the liquid crystal 140 is injected, then the liquid crystal injection port 130b is closed by a sealing part 130c.

In the liquid crystal panel 100, the transparent electrode 111a and the transparent electrode 121a oppose each other with the liquid crystal 140 sandwiched therebetween, thereby forming pixel regions. The pixel regions are arranged vertically and horizontally to configure a display region 100A. In the display region 100A, predetermined display information can be displayed by controlling the alignment of the liquid crystal for each pixel region. The internal wires 111 and 121b are drawn out of the display region 100A. The internal wires 111 on the surface of the transparent substrate 110 pass an area where the sealing member 130 is formed and are drawn out onto the surface of the projecting portion 110a so as to form the external wires 111d, the distal ends thereof forming external terminals. The internal wires 121b formed on the surface of the transparent substrate 120 extend to a position where the sealing member 130 is formed, and are provided with the outer end portions 121c at a position where they overlap the conducting region 130a of the sealing member 130.

Furthermore, the external wires 111b extending onto the surface of the projecting portion 110a from the position where they overlap the conducting region 130a of the sealing member 130 are formed on the surface of the transparent substrate 110. The external wires 111b are provided with the inner end portions 111c at a position where the conducting region 130a is formed. Hence, the internal wires 121b on the transparent substrate 120 and the external wires 111b on the transparent substrate 110 are conductively connected to each other through their outer end portions 121c and the inner end portions 111c which are in contact with the conducting region 130a.

Figure 2:
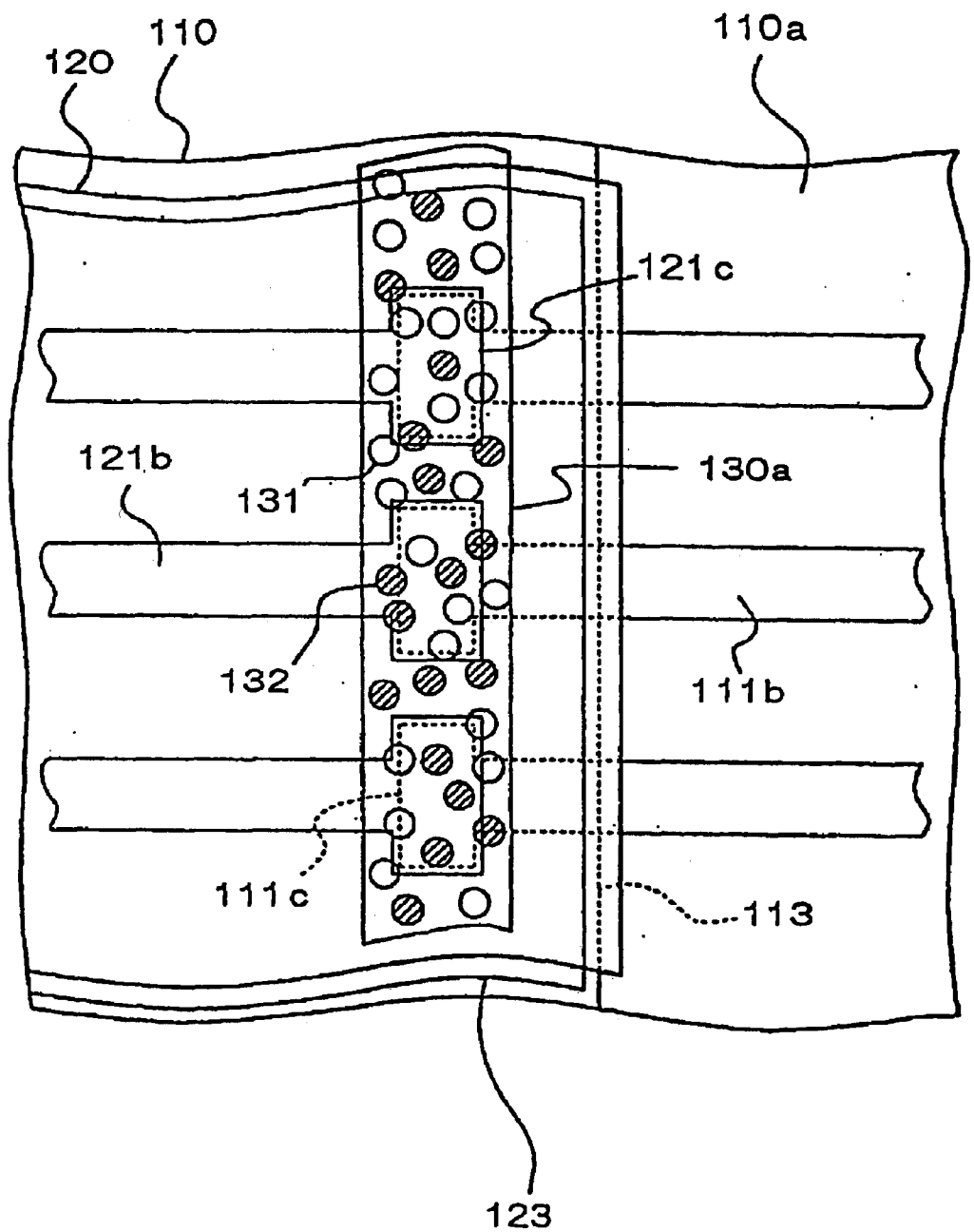
FIG. 2 is an enlarged top plan view showing the structure of the vertical conducting portion in the embodiment.
Figure 5:
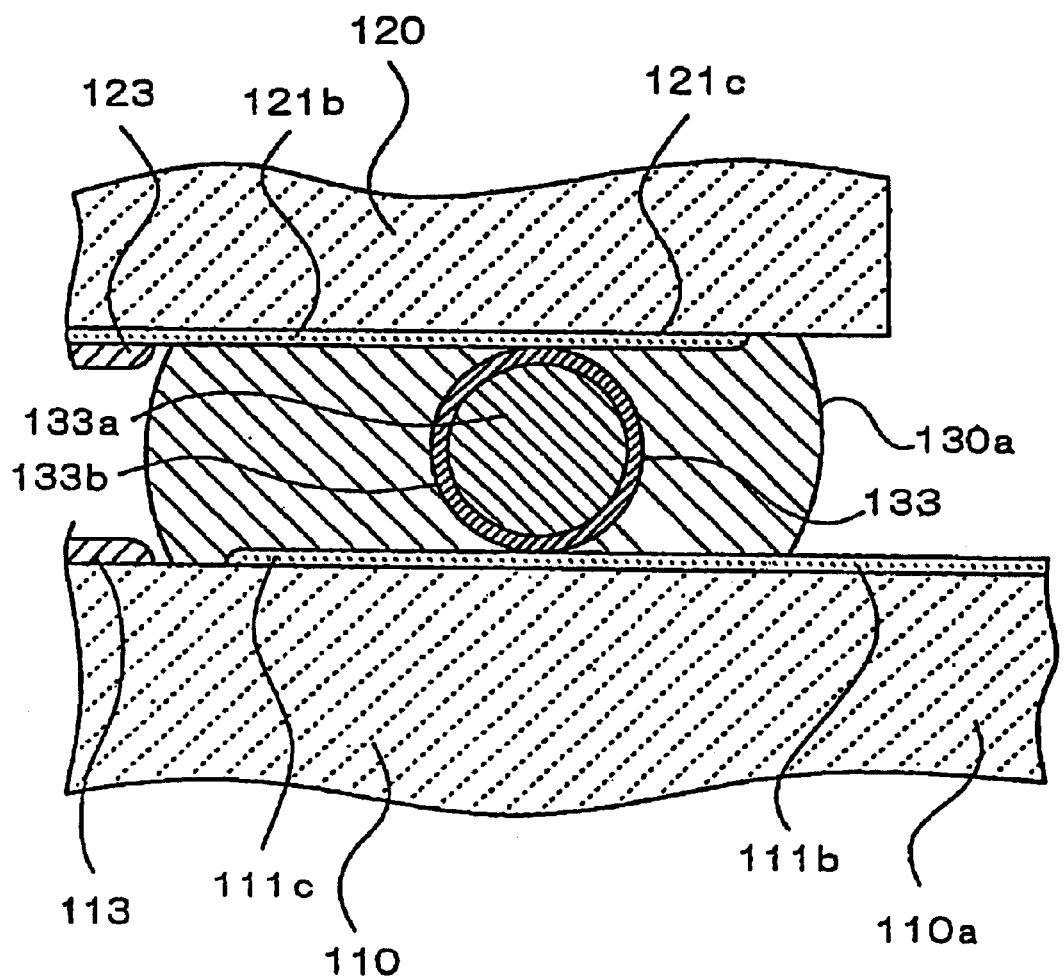
FIG. 5 is an enlarged sectional view showing a structure of a vertical conducting portion in a conventional liquid crystal device.
Figure 6:
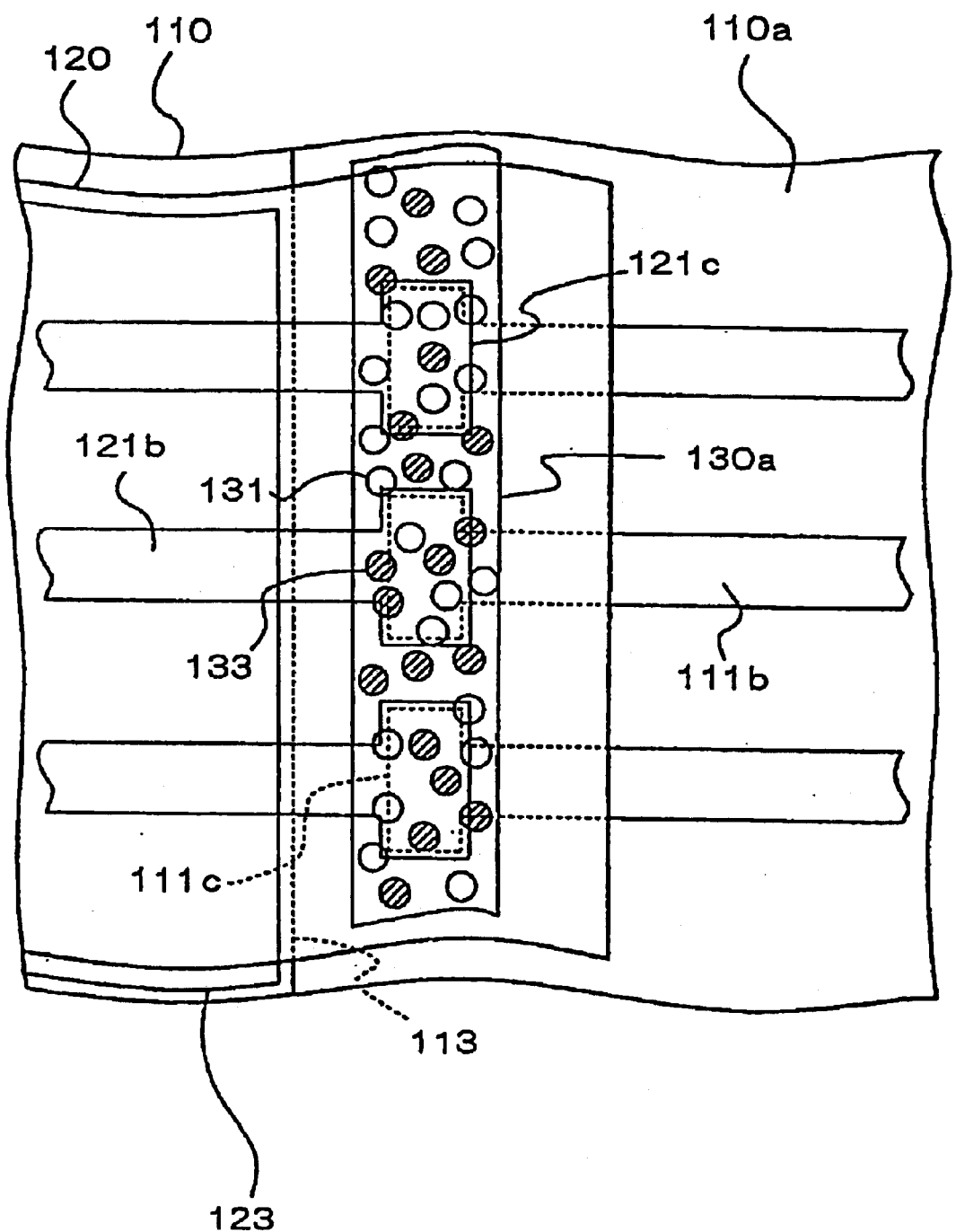
FIG. 6 is an enlarged top plan view showing the structure of the vertical conducting portion in the conventional liquid crystal device.

FIG. 1 is an enlarged sectional view showing the vertical conducting portion according to the embodiment, and FIG. 2 is an enlarged top plan view showing the vertical conducting portion according to the embodiment. In FIG. 2, the internal wires and the alignment layers formed on the surface of the transparent substrate 120 (on the back side of the transparent substrate 120 in FIG. 2), and the sealing member in contact with the surface are indicated by solid lines to represent a perspective state.

In the embodiment, as shown in FIG. 2, the spacers 131 and conductive particles 132 are dispersed in an uncured sealing member 130 beforehand, so that a desired cell thickness (an interval between the substrates, e.g. about 5 to about 10 $\mu$m) can be obtained by the spacers 131 when the transparent substrate 110 and the transparent substrate 120 are compression-bonded via the sealing member 130. The conductive particles 132 are formed to have an outside diameter that is substantially the same as or slightly larger than that of the spacers 131.

In the vertical conducting portion wherein the conducting region 130a of the sealing member 130 is disposed, the alignment layer 113 covers the inner end portions 111c in the external wires 111b on the transparent substrate 110, and the alignment layer 123 covers the outer end portions 121c in the internal wires 121b on the transparent substrate 120. In this embodiment, the alignment layers 113 and 123 are formed to have a thickness ranging from about 150 to about 300 angstroms that is slightly smaller than that in a prior art.

This embodiment is formed such that, when the transparent substrates 110 and 120 are compression-bonded via the sealing member 130, the conductive particles 132 formed to be slightly larger break through the relatively soft alignment layers 113 and 123 to become in contact with both the foregoing inner end portions 111c, which are the second conductive members, and the outer end portions 121c, which are the first conductive members, in a state shown in FIG. 1. In this state, the sealing member 130 is cured to fix the above components, thereby maintaining the conduction between the internal wires 121b and the external wires 111b.

Thus, it is preferable to form the conductive particles 132 to have an outside diameter that is slightly larger than the outside diameter of the spacers 131 to enhance reliability of vertical conduction accomplished by the conductive particles 132 that break through the alignment layers 113 and 123. To be more specific, the conductive particles 132 are preferably formed to have an outside diameter that is 5 to 20% larger than the outside diameter of the spacers 131. If the outside diameter is smaller than the above range, then it would be difficult to obtain the advantage (improved conduction reliability) accomplished by setting the outside diameter of the conductive particles 132 to a slightly larger value. On the other hand, if the outside diameter is larger than the above range, then the cell thickness of the liquid crystal display panel would be affected.

Similarly, to improve the conduction reliability of the vertical conducting portion, it is preferable to form the alignment layers to be slightly thinner than those in the prior art. To be more specific, the thickness of the alignment layers preferably range from 100 to 400 angstroms. It is further preferable to set the thickness to 100 to 300 angstroms as mentioned above. If the alignment layers are thinner than the above range, then the alignment layers would not be able to fully display their functions. If the above range is exceeded, then the conduction reliability in the vertical conducting portion would be considerably reduced.

In the embodiment, since the conductive particles break through the alignment layers to attain the vertical conduction as set forth above, there will be no problem with forming the alignment layers such that they extend to the vertical conducting portion, thus eliminating the restrictions on the position of the outer edges of the alignment layers. This adds to the freedom in design of the area surrounding the display area in the liquid crystal display panel. More specifically, hitherto, the outer edges of the alignment layers 113 and 123 had to be positioned between the outer edge position of the display area 100A of the liquid crystal display panel 100 and the inner edge position of the vertical portion (the conducting region 130a). This embodiment is free of such restrictions, so that the alignment layers 113 and 123 may be formed all over the vertical conducting portion or only in a part of the vertical conducting portion. Thus, there will be no problem with bringing closer the outer edge of the display area 100A and the inner edge of the vertical conducting portion. As a result, the area surrounding the display area 100A in the liquid crystal display panel 100 can be made narrower than in the prior art. Furthermore, the possibility of occurrence of product defects caused by dislocation during the formation of the alignment layers can be reduced.

Moreover, in the embodiment, the external wires 111b and the internal wires 121b are covered by the alignment layers 113 and 123 also in the vertical conducting portion, protecting the conductive member in the vertical conducting portion and also improving corrosion resistance. In addition, the alignment layers are formed to cover a larger area than in the prior art, so that the uniformity of the rubbing in the display area 100A can be improved. In particular, since it is possible to form the alignment layers over the entire surfaces of the substrates, the alignment layers can be formed more easily, and more uniformity of rubbing can be expected.

The liquid crystal device and the manufacturing method for the same in accordance with the present invention are not limited to the illustrated examples set forth above. Obviously, a variety of modifications may be added without deviating from the spirit of the present invention.

For instance, in the embodiment described above, the alignment layers 113 and 123 are formed to cover the entire areas of the transparent substrates 110 and 120 that oppose each other. Alternatively, however, the alignment layer may be formed on the whole surface of every substrate surface in both the transparent substrates 110 and 120, and after the illustrated panel structure is completed, the alignment layer on the surface of the projecting portion may be removed by plasma ashing or the like. In this case, an advantage can be obtained in which the need for the patterning (the formation of a printing pattern) itself of the alignment layers in the step for forming the alignment layers can be obviated, and uneven rubbing can be restrained in the rubbing process of the alignment layers since the alignment layers cover the entire surfaces of the substrates.

As described above, according to the present invention, the conductive particles in the conducting member break through alignment layers to conduct the first conductive member and the second conductive member; hence, it is no longer required to avoid the vertical conducting portion when forming the alignment layers, thus eliminating the restrictions on the positions of the outer edges of the alignment layers. As a result, the freedom in designing the area surrounding the display area of the liquid crystal device is increased, so that the surrounding area can be made narrower, permitting a larger display area and a reduced size of the liquid crystal device to be achieved. Furthermore, since the conductive members, such as wires, in the vertical conducting portion can be covered by the alignment layers, the corrosion resistance of the vertical conducting portion can be improved. Moreover, the alignment layers can be formed on a larger area, making it possible to enhance the uniformity of rubbing.

What is claimed is:

1. A manufacturing method for a liquid crystal device comprising:
   attaching a first substrate and a second substrate to each other with a liquid crystal sealed in therebetween so that a projecting portion of the first substrate projects outward beyond an outer edge of the second substrate;
   forming a first conductive member on a surface of the first substrate;
   forming a second conductive member on a portion of the second substrate that opposes the first conductive member;
   forming an alignment layer having a thickness of 100 to 400 angstroms to cover a surface of the projecting portion as well as a surface of the first conductive member and the second conductive member;
   using compression bonding to conductively connect the first conductive member and the second conductive member in a vertical conducting portion with a conductive material containing conductive particles and non-conductive spacers, the conductive particles having an outside diameter that is 5 to 20% larger than an outside diameter of the non-conductive spacers, the compression bonding causing the conductive particles to break through the alignment layer to conductively contact the first conductive member and the second conductive member; and removing the alignment layer on the surface of the projecting portion after the compression bonding.

2. The manufacturing method for a liquid crystal device according to claim 1, wherein the step for forming the alignment layer further comprises forming the alignment layer the whole surface where the first substrate and the second substrate oppose each other.

3. The manufacturing method for a liquid crystal device according to claim 1, wherein the conductive material is used as a sealing material for sealing the liquid crystal between the first substrate and the second substrate.

4. The manufacturing method for a liquid crystal device according to claim 1, wherein the alignment layer on the surface of the projecting portion is removed by plasma ashing after the compression bonding.

* * * * *

UNITED STATES PATENT AND TRADEMARK OFFICE
CERTIFICATE OF CORRECTION

PATENT NO. : 6,724,448 B2  Page 1 of 1
DATED : April 20, 2004
INVENTOR(S) : Nakahara It is certified that error appears in the above-identified patent and that said Letters Patent is hereby corrected as shown below:

<u>Title page,</u>
Item [56], References Cited, FOREIGN PATENT DOCUMENTS, "JP 04-083227 7/1990" should be -- JP 04-083227   3/1992 --

<u>Column 2,</u>
Line 26, "edges" should be -- edge --

<u>Column 4,</u>
Line 18, "portions" should be -- portion --

Signed and Sealed this

Seventh Day of June, 2005

JON W. DUDAS
*Director of the United States Patent and Trademark Office*